US007007975B2

(12) United States Patent
Taylor et al.

(10) Patent No.: US 7,007,975 B2
(45) Date of Patent: Mar. 7, 2006

(54) FOLDABLE CHILD RIDING VEHICLE

(76) Inventors: Loren T. Taylor, 40 Dellwood Ave., Chatham, NJ (US) 07928; Brian Walker, 21165 Scottsdale Dr., Bend, OR (US) 97701

( * ) Notice: Subject to any disclaimer, the term of this patent is extended or adjusted under 35 U.S.C. 154(b) by 0 days.

(21) Appl. No.: 10/844,799

(22) Filed: May 13, 2004

(65) Prior Publication Data

US 2004/0227340 A1 Nov. 18, 2004

Related U.S. Application Data

(60) Provisional application No. 60/470,338, filed on May 14, 2003.

(51) Int. Cl.
*B60R 21/14* (2006.01)
*B60K 1/00* (2006.01)

(52) U.S. Cl. ...................... 280/781; 180/65.1; 180/208

(58) Field of Classification Search ................ 280/781, 280/782, 639, 278; 180/65.1, 908, 208
See application file for complete search history.

(56) References Cited

U.S. PATENT DOCUMENTS

| | | | | |
|---|---|---|---|---|
| 3,004,619 A | * | 10/1961 | Straussler | 180/208 |
| 3,580,348 A | | 5/1971 | Di Blasi | |
| 3,797,597 A | | 3/1974 | Miranda | |
| 3,905,618 A | | 9/1975 | Miranda | |
| 4,026,573 A | | 5/1977 | Richardson | |
| 4,037,678 A | * | 7/1977 | Braune | 180/11 |
| 4,087,107 A | | 5/1978 | Winchell | |
| 4,089,542 A | | 5/1978 | Westerman | |
| 4,209,073 A | | 6/1980 | Enix | |
| 5,692,760 A | | 12/1997 | Pickering | |
| 5,957,482 A | | 9/1999 | Shorter | |
| 6,588,787 B1 | * | 7/2003 | Ou | 280/287 |
| 6,739,421 B1 | * | 5/2004 | Miya | 180/220 |
| 2002/0066610 A1 | * | 6/2002 | Tsai | 180/220 |

FOREIGN PATENT DOCUMENTS

| | | | |
|---|---|---|---|
| FR | 2768990 A1 | * | 4/1999 |
| JP | 59073373 A | * | 4/1984 |

* cited by examiner

*Primary Examiner*—David R. Dunn
(74) *Attorney, Agent, or Firm*—Cohen, Pontani, Lieberman & Pavane

(57) ABSTRACT

A foldable electric powered child riding vehicle includes a front module pivotally connected to a rear module. In a riding configuration, the modules are secured together in a stretched (i.e., deployed) position. An electric drive of the vehicle may be enabled only after the modules have been secured in the stretched position. In a storage/transportation configuration, the modules are disengaged and rotationally folded.

25 Claims, 9 Drawing Sheets

FOLDABLE CHILD RIDING VEHICLE

RELATED APPLICATIONS

This application claims priority from U.S. Provisional Patent Application Ser. No. 60/470,338 which was filed on May 14, 2003 and which is incorporated by reference.

BACKGROUND OF THE INVENTION

1. Field of the Invention

The present invention generally relates to toy vehicles and, more specifically, to foldable electric powered child riding vehicles.

2. Description of the Related Art

Electric powered child riding vehicles have become popular recreational and educational toys for children. Such vehicles typically have a relatively slow speed capability of, for example, no more than ten mph. In general, electric powered child riding vehicles require a safe and sizeable riding area so that a child has room to manipulate and operate the vehicle. Moreover, existing electric powered toy riding vehicles are large, bulky, and therefore not easily transported in, for example, the trunk of a car. Thus, the toy vehicles are, in almost all circumstances, operated on or around the property of the owner, e.g., the child's backyard, surrounding sidewalks and neighborhood etc. As a result of the riding area requirement and lack of portability, existing electric powered child riding vehicles have traditionally been prevalent mostly in middle and upper-class residential neighborhoods were safe sidewalks and large properties provide adequate vehicle operating room.

Several types of foldable child riding, electric powered vehicles have been developed. Nevertheless, difficulties are still encountered in providing a vehicle that can be promptly converted from a folded position to a deployed riding position, and then checked for correctness of the assembly and operational safety.

Therefore, there is a need in the art for an improved foldable electric powered child riding vehicle.

SUMMARY OF THE INVENTION

The present invention is directed to a foldable electric powered child riding vehicle comprising a front module and a rear module which are pivotally connected to each other. In a riding configuration, the modules are secured together in an unfolded (i.e., deployed) position. An electric drive of the vehicle is selectively disabled until the modules have been secured in the deployed position. In a storage/transportation configuration, the modules are electrically disengaged and may be rotationally folded such that a roadside surface of the front module becomes proximate the roadside surface of the rear module. This folded configuration allows for convenient storage and transport of the vehicle.

In one embodiment, the foldable electric powered child riding vehicle comprises a front module, a rear module pivotally coupled to the front module, and at least one mounting assembly connected between the front module and the rear module. The mounting assembly allows the modules to be selectively moved between a deployed state in which the modules are secured to each other in a riding position and operating power may be provided to the vehicle, and an un-deployed state in which operating power is prevented from being provided to the vehicle.

In another embodiment, a foldable electric powered child riding vehicle is provided having a front module, a rear module pivotally coupled to the front module, and at least one mounting assembly connected between the front module and the rear module. The mounting assembly allows the modules to be selectively moved between a deployed state in which the modules are secured to each other in a riding position, and an un-deployed state.

Embodiments of the invention include vehicles where a protective hood or a rider seat or both have foldable portions. Such portions are secured in upright positions for facilitating vehicle operating and folded down for facilitating storage/transportation of the vehicle.

Other objects and features of the present invention will become apparent from the following detailed description considered in conjunction with the accompanying drawings. It is to be understood, however, that the drawings are designed solely for purposes of illustration and not as a definition of the limits of the invention, for which reference should be made to the appended claims. It should be further understood that the drawings are not necessarily drawn to scale and that, unless otherwise indicated, they are merely intended to conceptually illustrate the structures and procedures described herein.

BRIEF DESCRIPTION OF THE DRAWINGS

In the drawings.

The teachings of the present invention will become apparent by considering the following detailed description in conjunction with the accompanying drawings, in which.

For illustrative purposes, the images in FIGS. 1–9 are conventionally simplified and are not depicted to scale.

The appended drawings illustrate exemplary embodiments of the invention and, as such, should not be considered limiting the scope of the invention that may admit to other equally effective embodiments.

DETAILED DESCRIPTION OF THE PRESENTLY PREFERRED EMBODIMENTS

The present invention advantageously provides a foldable electric powered child riding vehicle. In a folded storage/transportation configuration, the vehicle is dimensioned to fit in a small compartment, such as a trunk of a passenger car. For operational safety, an electric drive of the vehicle is selectively enabled when the vehicle is secured in an unfolded riding configuration for allowing operation of the vehicle in a forward and/or reverse direction.

Figure 1:
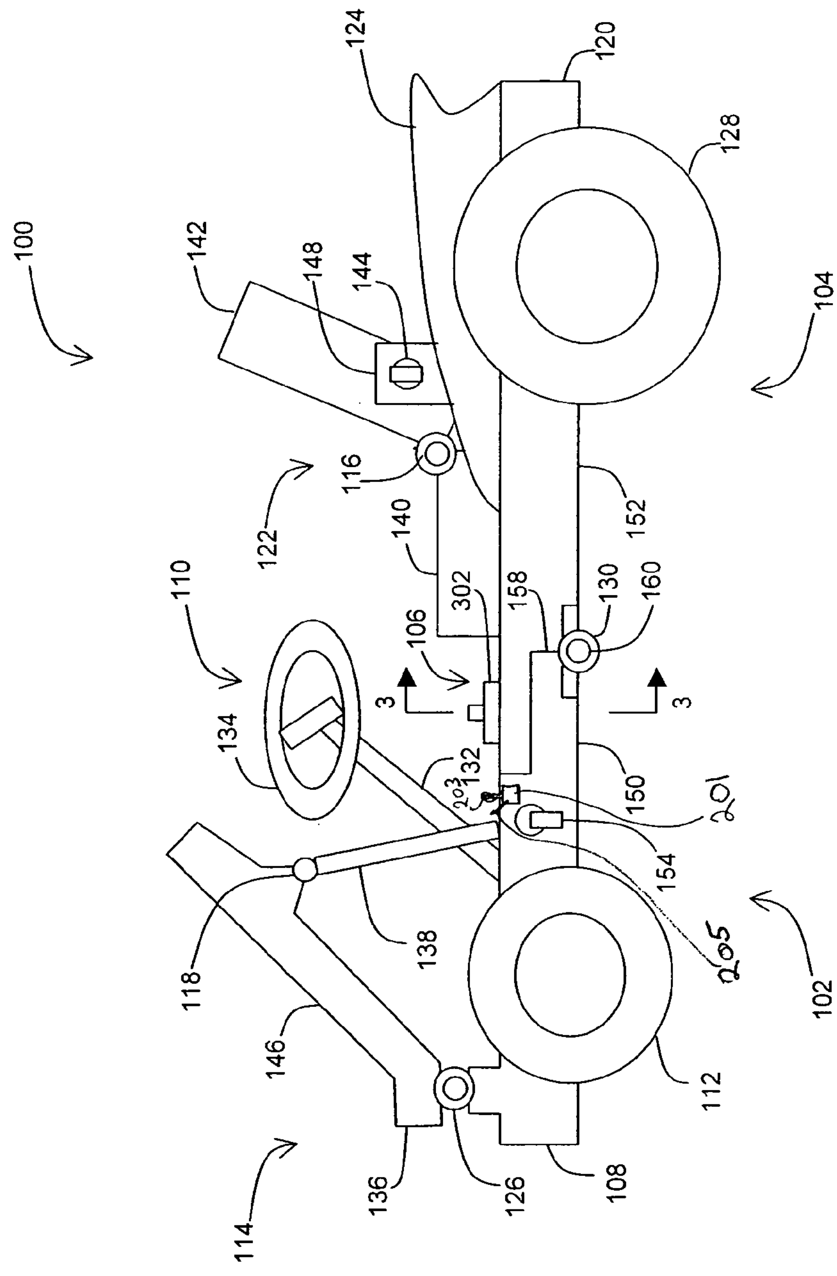
FIG. 1 is a schematic side view of a foldable electric powered child riding vehicle in accordance with one embodiment of the present invention.
Figure 2:
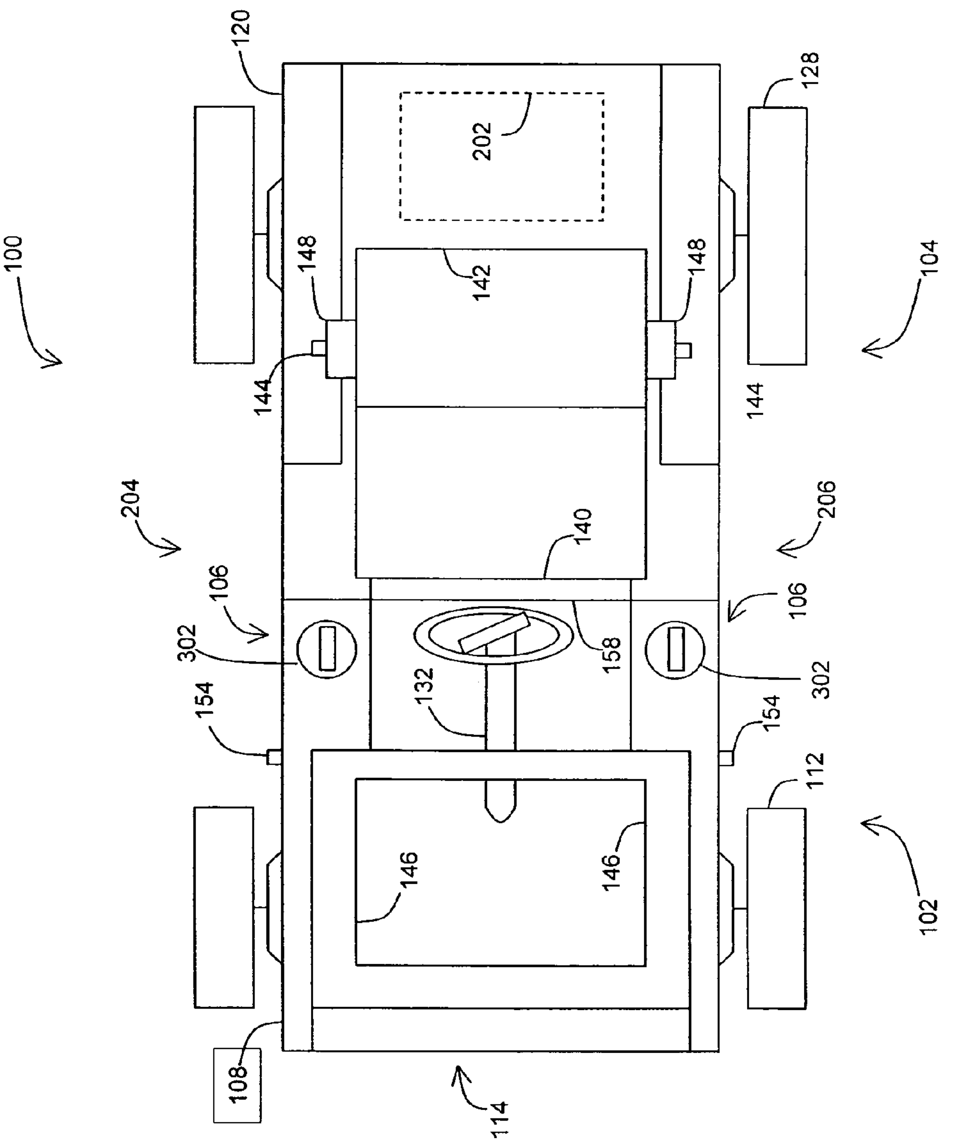
FIG. 2 is a schematic top plan view of the vehicle of FIG. 1.

FIGS. 1–2 depict schematic side and top plan views, respectively, of a foldable electric powered child riding vehicle 100 in accordance with one embodiment of the present invention. The vehicle 100 is shown in a riding (i.e., unfolded, stretched or deployed) configuration. Illustratively, the vehicle 100 comprises a front module 102 and a rear module 104. Structural and decorative elements of the modules may be conventionally fabricated from plastics, resins, wood, and the like materials. The modules 102 and 104 are pivotally connected to one another by at least one hinge 130 and are secured, in the deployed position, along a break line 158 using at least one mounting assembly 106. In the depicted exemplary embodiment, the vehicle 100 comprises one hinge 130 having an axis 160 and two mounting assemblies 106. In this embodiment, a length of the hinge 130 is substantially equal to a width of the vehicle 100, while the mounting assemblies 106 are disposed proximate opposing sides 204 and 206 of the vehicle. In an alternate embodiment, the hinge 130 may include, e.g., two portions each disposed proximate the sides 204 and 206.

The front module 102 generally includes a front chassis 108, a steering unit 110, at least one front wheel 112 (two wheels 112 are shown) kinematically coupled to the steering unit 110, a hood assembly 114, as well as conventional ride controls (not shown) for operating an electric motor, brakes, optional displays, light indicators or rearview mirrors, and the like.

The steering unit 110 includes a tiltable steering shaft 132 and a steering wheel 134 that is rigidly fastened to the shaft 132. In one embodiment, the hood assembly 114 illustratively comprises a protective bracket 136, two side bars 138, and two lockable pins 154. The protective bracket 136 is pivotally connected to the front chassis 108 using at least one hinge 126 and is supported in an upright position by the side bars 138. Each side bar 138 is rotatably attached to a respective arm 146 of the bracket 136 by a hinge 118 and may be detachably fastened to the front chassis 108 using the lockable pins 154.

The rear module 104 generally includes a rear chassis 120, a rider seat assembly 122, a cover (fender) 124, an electric drive 202 (shown with broken lines), at least one drive wheel 128 (two wheels 128 are shown) kinematically coupled to the drive 202, as well as conventional features (not shown), such as a port for connecting a battery of the electric drive 202 to an external charger, a hitch, optional light indicators, and the like. It will be appreciated that the front wheel(s) and the back wheel(s) may be of the same size or of different sizes. Moreover, a three-wheel vehicle is also contemplated wherein, for example, two rear wheels and a single front wheel are provided.

The rider seat assembly 122 comprises a stationary horizontal portion 140 and a foldable back portion 142. In the depicted embodiment, the back portion 142 is pivotally linked to the horizontal portion 140 using at least one hinge 116. Alternatively (not shown), the back portion 142 may similarly be linked to the rear chassis 120. In the depicted embodiment, the back portion 142 is illustratively supported in an upright position by pillars 148. The back portion 142 is secured to pillars 148 using fasteners 144, such as a lock-down screw (as shown), clamp, and the like. The pillars 148 may be mounted on a floorboard or, alternatively, sidebars of the rear chassis 120.

Together, the front chassis 108, the rear chassis 120, and hinge assemblies 106 form a foldable frame of the vehicle 100. In one embodiment, the mounting assembly 106 facilitates connectivity for a portion of wiring to the electrical drive 202 of the vehicle 100 only after the front chassis 108 and the rear chassis 120 have been secured together in a stretched or deployed position corresponding to the riding configuration of the vehicle. In this embodiment, the electrical drive 202 may be enabled (i.e., electric motor may be started and/or operated) only after the vehicle 100 has been properly unfolded and secured in the riding configuration, thus protecting a child from riding a partially or defectively assembled vehicle.

Figure 3:
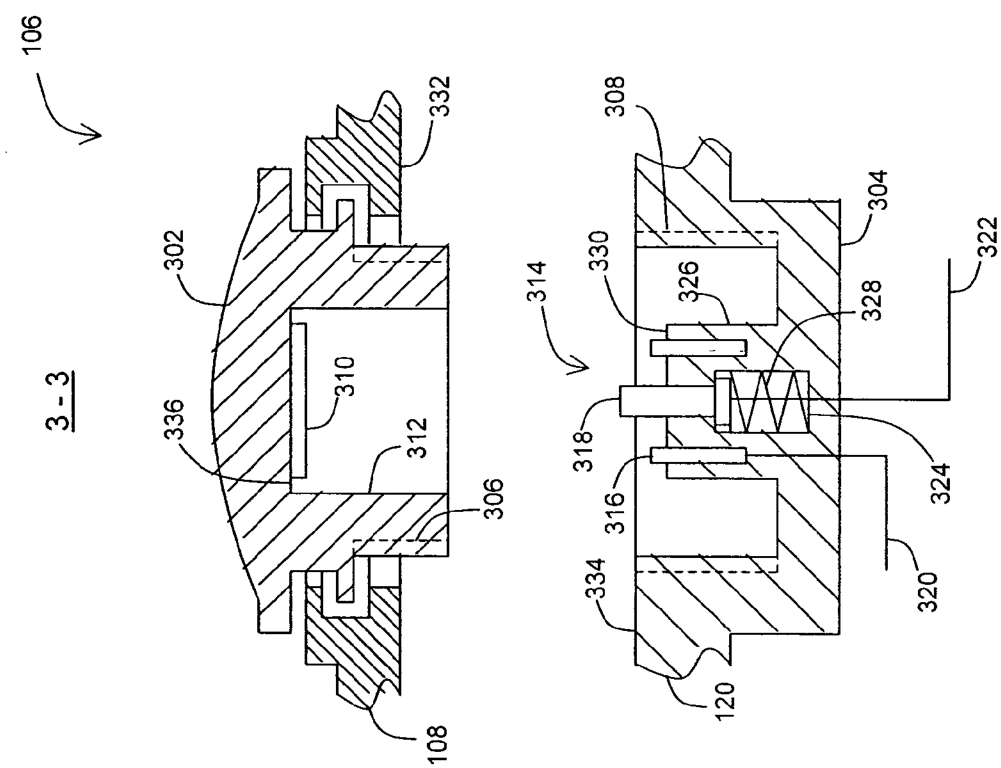
FIG. 3 is a schematic cross-sectional view and wiring diagram of a mounting assembly of the vehicle of FIG. 1.

FIG. 3 depicts a schematic cross-sectional view and a wiring diagram of the mounting assembly 106 of the vehicle of FIGS. 1–2 in accordance with one embodiment of the present invention. The cross-sectional view is taken along a line 3—3 in FIG. 1.

The mounting assembly 106 generally comprises a lockable fastener 302 (e.g. a lock-down screw) and a receptacle 304. For a purpose of graphical clarity, the fastener 302 and receptacle 304 are shown in a disengaged position. In the depicted embodiment, the receptacle 304 comprises a portion of the front chassis 114. Alternatively (not shown), the receptacle 304 may be an insert that is rigidly coupled to the rear chassis 120.

The fastener 302 and receptacle 304 have mating threads 306 and 308, respectively. In the riding configuration, the fastener 302 is pushed downward into, and turned with respect to, the receptacle 304, thus attaching the front chassis 108 to the rear chassis 120. In this position, opposing surfaces 332 and 334 of the fastener 302 and receptacle 304, respectively, coincide and become compressed against one another. Oppositely, the fastener 302 may be unscrewed from the receptacle 304 to transform the vehicle 100 from the riding configuration to the storage/transportation configuration, as discussed in detail below in reference to FIGS. 5–6.

In one embodiment, the fastener 302 includes a conductive portion, such as a disk 310 attached to a bottom surface 336 of a recess 312 and the receptacle 304 comprises a contact group 314 disposed in a post 326 of the receptacle. In this embodiment, the fastener 302 and post 326 are both formed from non-conductive materials (i.e., insulators), such as plastics, epoxy-based compounds, and the like. The contact group 314 generally comprises a stationary peripheral contact 316 (e.g., circular contact) and a spring-loaded central contact 318. The central contact 318 is movably positioned in a cavity 324 and is axially biased using a spring 328. The peripheral contact 316 and central contact 318 are coupled to wires 320 and 322, respectively. Outside the receptacle 304, the wires 320 and 322 are conventionally insulated. The wires 320, 322 are conductors of a network that, in operation, enables the electric drive 202 (e.g., connects a drive battery to an electric motor of the drive). In the vehicle 100, the electric motor can be operated only when the peripheral contact 316 and the central contact 318 form an electric circuit with the conductive disk 310. This occurs only when the vehicle is in its fully-deployed state.

The contacts 316 and 318 protrude through a surface 330 of the post 324 such that, when in an engaged position with the fastener 302 screwed into the receptacle 304, both contacts reach the conductive disk 310. The conductive disk 310 facilitates the short circuit between the contacts 316 and 318, thus making the electric drive 202 operational. In the vehicle 100, the short circuit between the contacts 316 and 318 is formed after the mounting assembly 106 has securely attached the front chassis 108 to the rear chassis 120, i.e., in the riding configuration of the vehicle. Oppositely, when mechanical coupling between the chassis 108 and chassis 120 is at least partially disengaged or loosened, such as by turning the fastener 302 is a direction opposite to the direction used in engaging the fastener in the receptacle 304, the spring 328 urges the disk 310 away from contact 316 so that a short circuit state of the contacts 316 and 318 is terminated and the electric drive 202 becomes disabled. Thus, easy manipulation of the mounting assembly 106 simultaneously secures the vehicle in the deployed state and also connects operating power.

In the vehicle of FIGS. 1–2, the contact groups 314 of the mounting assemblies 106 are connected in series, i.e., they form a series electrical circuit. Therefore, in the vehicle 100, the electric drive 202 may be enabled only when, in both assemblies 106, the fasteners 302 have been tightened in the receptacles 304 and, as such, the conductive disks 310 and contacts 316, 318 of the assemblies have formed the short circuits.

In a further embodiment, the vehicle 100 may comprise a test circuit 201 for detecting the short circuit state of contacts of the contact group(s) 314 and, as such, if the front module 102 and the rear module 104 are secured in the stretched (i.e., deployed) position, the vehicle will operate. Illustratively, the test circuit comprises one or more light emitting diodes (LED) 203 and a push-button switch 205 enabling the LEDs to selectively radiate visible light when, in the riding configuration of the vehicle 100, the modules 102 and 104 are secured together.

From the deployed riding configuration, the vehicle of FIGS. 1–2 may be converted into the folded storage/transportation configuration in two steps discussed below in reference to FIGS. 4–6. At a first step, the protective bracket 136 of the hood assembly 114 and the back portion 142 of rider seat assembly 122 are folded down. Then, at a second step, the front module 102 and the rear module 104 are disengaged by unlocking the fastener 302 and then folded inwards such that a roadside surface 150 of the front module 102 becomes proximate a roadside surface 152 of the rear module 104. The vehicle may be unfolded in the riding configuration by performing these steps in a reverse order.

Figure 4:
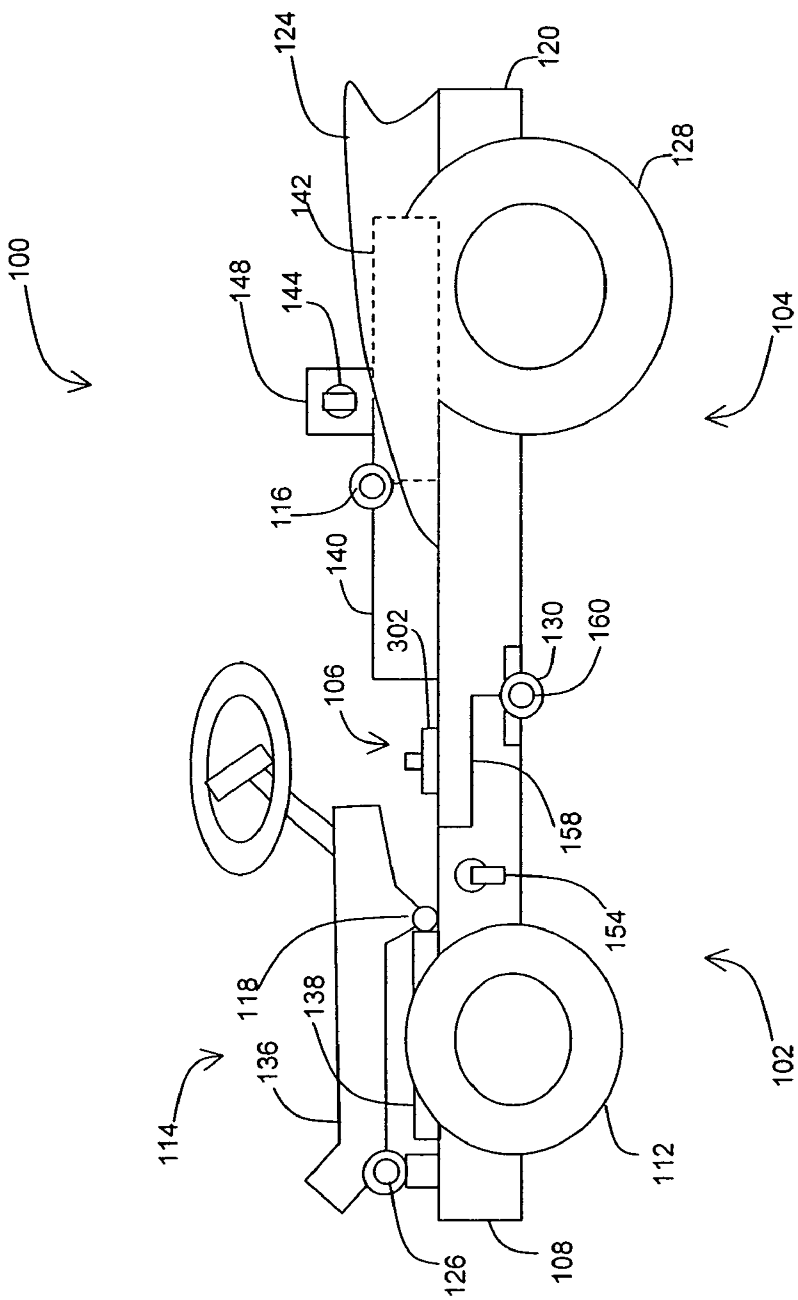
FIG. 4 is a side view of the vehicle of FIG. 1 showing a protective hood and a seat back portion of a rider seat in folded positions.

FIG. 4 depicts a schematic side view of the vehicle of FIGS. 1–2 having the hood assembly 114 and the rider seat assembly 122 in folded positions. To fold the bracket 136, the pins 154 are disengaged and the side bars 138 are decoupled from the front chassis 108 and positioned along the arms 146. Then, the bracket 136 is tilted inwardly down (i.e., towards the rear module 104). In the depicted embodiment, to fold the back portion 142 of the rider seat assembly 122, the fasteners 144 are disengaged and the back portion 142 (illustratively shown using broken lines where view is obstructed) is tilted down away from the front module 102 to become substantially coplanar with the horizontal portion 140 of the seat. In an alternate embodiment (not shown), the back portion 142 may be tilted towards the front module 102 to coincide with the horizontal portion 140 of the assembly 122.

Figure 5:
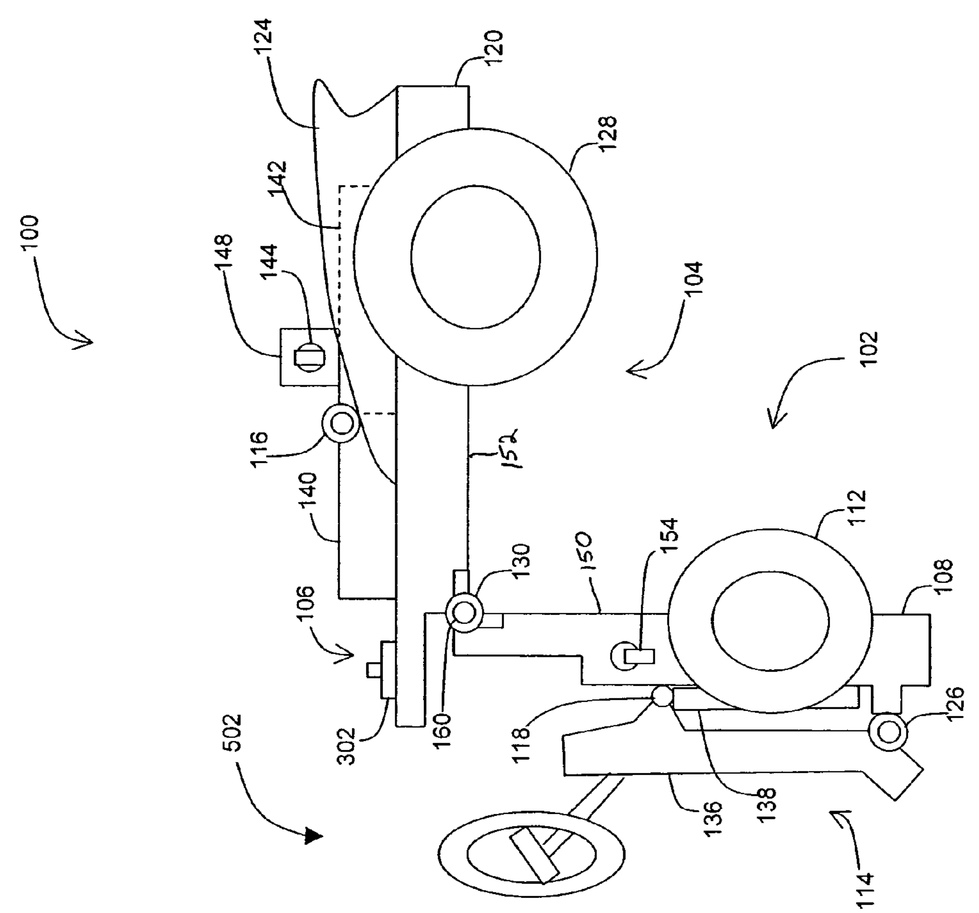
FIG. 5 is a side view of the vehicle of FIG. 1 having a front module partially folded towards the rear module.

FIG. 5 depicts a schematic side view of the vehicle of FIGS. 1–2 having the front module 102 partially folded towards the rear module 104. To fold the front module 102, the fasteners 302 of the mounting assemblies 106 are disengaged and then the front module 102 is rotatably folded downwards about the axis 160 along the hinge 130, as illustrated using an arrow 502.

Figure 6:
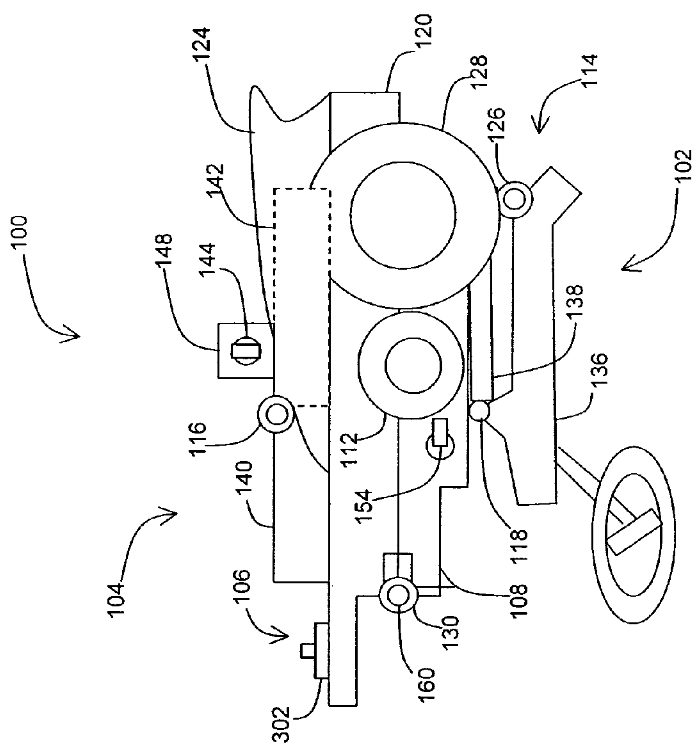
FIG. 6 is a schematic side view of the vehicle of FIG. 1 in a storage/transportation configuration.

FIG. 6 depicts a schematic side view of the vehicle of FIGS. 1–2 having the front module 102 folded about the axis 160 in the direction of the arrow 502. Such a position of the modules 102 and 104 corresponds to the storage/transportation configuration of the vehicle 100. In the storage/ transportation configuration, the vehicle occupies minimal space and may be placed, e.g., in a trunk of a passenger car.

Figure 7:
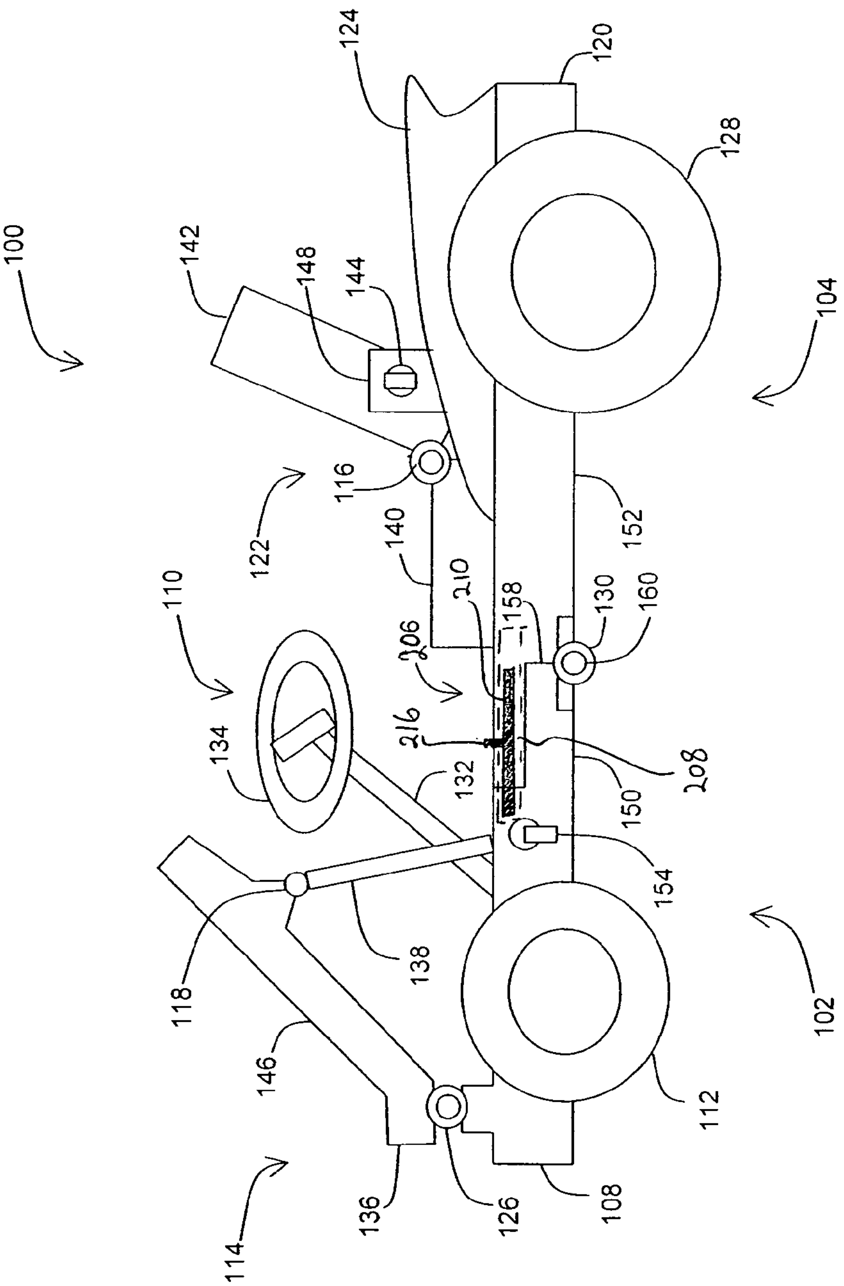
FIG. 7. is a schematic side view of an alternative mounting assembly used in a foldable electric powered child riding vehicle.
Figure 8:
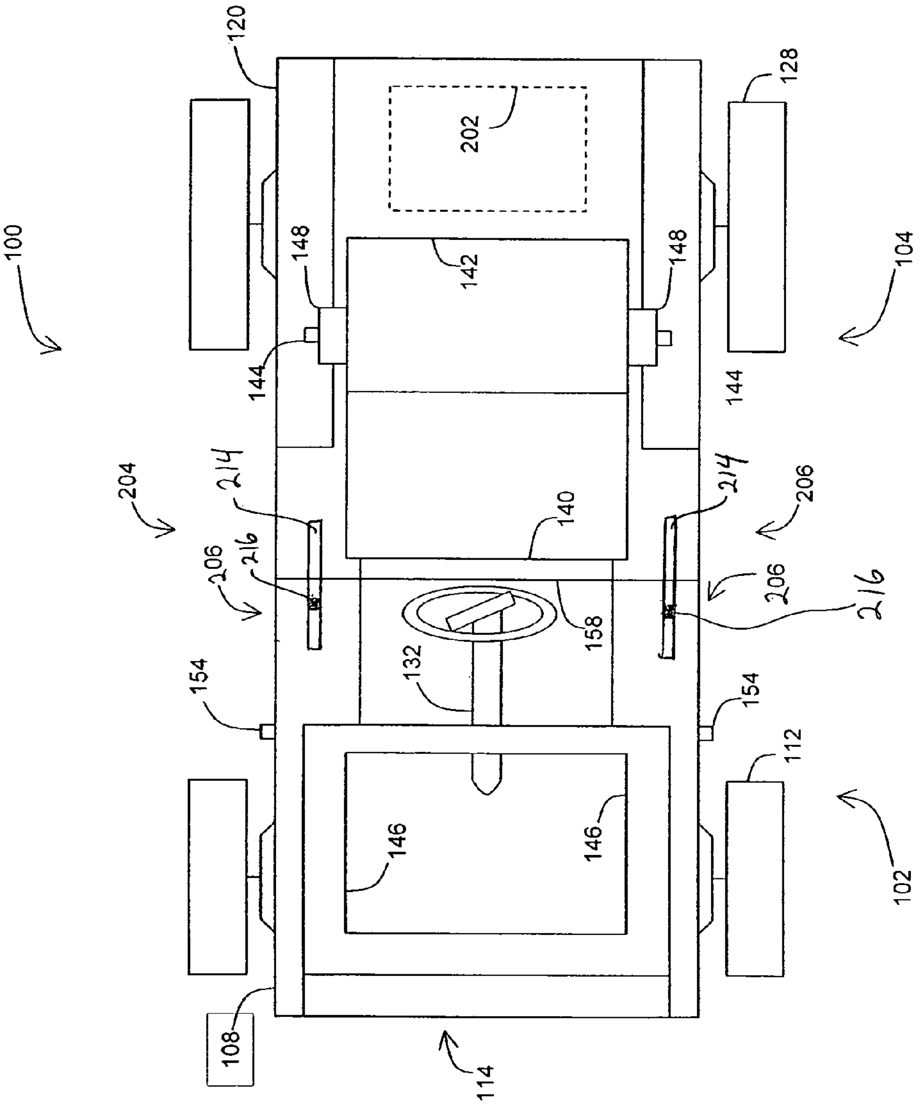
FIG. 8. is a schematic top plan view of the vehicle of FIG. 7.
Figure 9:
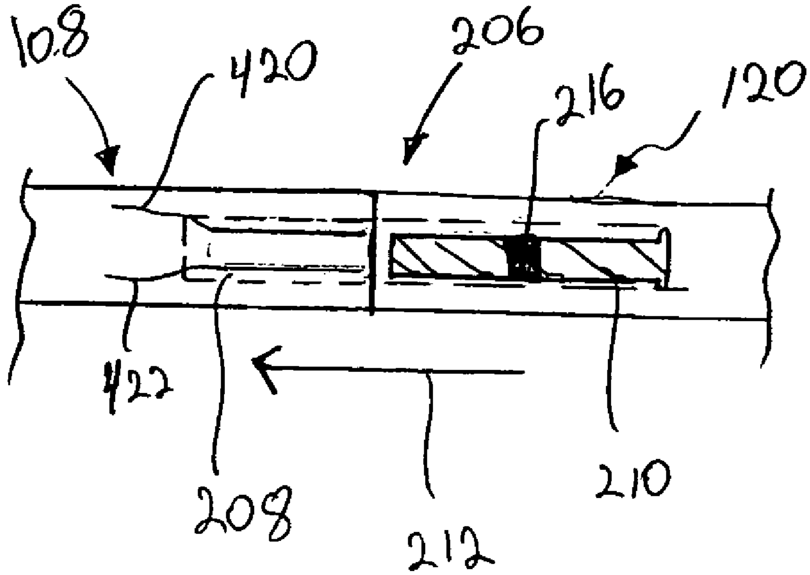
FIG. 9. is a schematic top view of the alternative mounting assembly of FIG. 7.

With reference to FIGS. 7–9, an alternative mounting assembly 206 to the mounting assembly 106 can be used to secure the front chassis 108 to the rear chassis 120 while simultaneously providing a short circuit for electrical power required for vehicle operation. The mounting assembly 206 includes a channel 208 having a portion formed within the front chassis 108 and another portion formed within the rear chassis 120 so that when the chassis are aligned in their intended manner, the channel is continuous as shown in FIG. 7. Disposed within the slot are the conductor wires 420, 422. Also disposed in the channel 208 is a sliding member 210 having a handle portion 216 connected thereto. The sliding member 210 is comprised of or supports a coating of conductive material. When the vehicle is in its folded, un-deployed state, the slider member 210 is in a retracted position contained within the channel portion of the rear chassis 120. When the vehicle 100 is manipulated to its deployed position, the slider member can be moved to a forward position by pushing handle 216 in a direction indicated by arrow 212 in FIG. 9. The forward position of the slider member secures the chassis in the deployed position and also creates a short circuit between the wires 420, 422 to allow for the vehicle operation. Thus, the vehicle 100 can be simultaneously secured in the siding position while electrical power is provided, i.e. with a single motion of the slider 210. To provide user access to the handle 216, a slot 214 is formed in the upper surface of the front and rear chassis, on either side of the driver seat, so that the handle 216 protrudes upward from the slot. In a preferred embodiment, two mounting assemblies 206 are provided, as shown in FIG. 8.

It will be readily appreciated by those having ordinary skill in the art that other electro-mechanical coupling configurations can be used to simultaneously secure the front chassis 108 and rear chassis 120 in their deployed position while creating an electrical short circuit between the conductors 420, 422 to provide safe deployment and electrical connection.

Thus, while there have been shown and described and pointed out fundamental novel features of the present invention as applied to preferred embodiments thereof, it will be understood that various omissions and substitutions and changes in the form and details of the devices described and illustrated, and in their operation, and of the methods described may be made by those skilled in the art without departing from the spirit of the present invention. For example, it is expressly intended that all combinations of those elements and/or method steps which perform substantially the same function in substantially the same way to achieve the same results are within the scope of the invention. Substitutions of elements from one described embodiment to another are also fully intended and contemplated. It is the intention, therefore, to be limited only as indicated by the scope of the claims appended hereto.

What is claimed is:

1. A foldable electric powered child riding vehicle comprising:

a front module;

a rear module pivotally coupled to the front module;

at least one mounting assembly connected between the front module and the rear module, the mounting assembly allowing the modules to be selectively moved between a deployed state in which the modules are secured to each other in a riding position and operating power may be provided to the vehicle, and an undeployed state in which operating power is prevented from being provided to the vehicle, and wherein the front module comprises a hood having a foldable upright member, and the rear module comprises a rider seat having a foldable upright portion.

2. The vehicle of claim 1, wherein in the riding configuration of the vehicle the front module and the rear module are secured in an unfolded stretched position.

3. The vehicle of claim 1, wherein, in the storage/transportation configuration, the upright member of the protective hood is folded towards the rear module and the back portion of the rider seat is folded away from the front module or folded towards the front module.

4. The vehicle of claim 3, wherein said rear module includes at least one rear wheel, and wherein said front module includes at least one front wheel.

5. The vehicle of claim 1, comprising two mounting assemblies each disposed proximate opposing sides of the vehicle on either side of a steering control.

6. The vehicle of claim 1, wherein the front module is pivotally connected to the rear module using at least one hinge coupling adjacent ends of said modules.

7. The vehicle of claim 6, comprising a hinge having a length that is substantially equal to a width of the vehicle.

8. The vehicle of claim 1, wherein the at least one mounting assembly comprises:

a lockable fastener;

a receptacle, and a contact group selectively enabling the electric drive when the fastener is in an engaged position.

9. The vehicle of claim 8, wherein the lockable fastener comprises a lock-down screw.

10. The vehicle of claim 9, wherein the lockable fastener and a receptacle have mating threads.

11. The vehicle of claim 8, wherein the receptacle comprises at least two electrically isolated contacts.

12. The vehicle of claim 11, wherein the fastener further comprises a conductive member facilitating an electric short-circuit between the at least two electrically isolated contacts when the fastener is an engaged position.

13. The vehicle of claim 11, wherein the at least two electrically isolated contacts include a spring-loaded center contact and a circular peripheral contact.

14. The vehicle of claim 8, wherein contact groups of the at least one mounting assembly are connected to form a series electrical circuit.

15. The vehicle of claim 1, further comprising a test circuit indicating when the front module and the rear module are secured in the riding configuration.

16. The vehicle of claim 15, wherein the test circuit comprises a light emitting diode (LED) and a push-button switch enabling the LED to radiate visible light when the front module and the rear module are secured in the riding configuration.

17. The vehicle of claim 1, wherein the at least one mounting assembly comprises:

a channel having a first portion formed in the front module and a second portion formed in the rear module, the first and second channel portions being in alignment with each other when the front module and rear module are in the deployed state;

a member disposed in the channel and slidable between a retracted position wherein the member is disposed in one of the first and second channel portions, and an extended position wherein the member is disposed in both of the first and second channel portions;

a conductor supported on, and slidably moveable with, the member; and a contact group disposed in the channel in the other of the first and second channel portions, the conductor engaging the contact group when the member is moved to the extended position to provide operating power to the vehicle.

18. The vehicle of claim 1, wherein .in a storage/transportation configuration of the vehicle the front module and the rear module are rotationally tilted towards one another until a roadside surface of the front module becomes proximate a roadside surface of the rear module.

19. A foldable electric powered child riding vehicle comprising:

a front module;

a rear module pivotally coupled to the front module;

at least two mounting assemblies, each connected between the front module and the rear module, the mounting assemblies allowing the modules to be selectively moved between a deployed state in which the modules are secured to each other in a riding position and operating power may be provided to the vehicle, and an un-deployed state in which operating power is prevented from being provided to the vehicle, the mounting assemblies each being disposed proximate opposing sides of the vehicle on either side of a steering control.

20. The vehicle of claim 19, wherein at least one of the mounting assemblies comprises:

a lockable fastener;

a receptacle, and a contact group selectively enabling the electric drive when the fastener is in an engaged position.

21. The vehicle of claim 20, wherein the receptacle comprises at least two electrically isolated contacts.

22. The vehicle of claim 20, wherein the fastener further comprises a conductive member facilitating an electric short-circuit between the at least two electrically isolated contacts when the fastener is an engaged position.

23. The vehicle of claim 20, wherein contact groups of the at least one mounting assembly are connected to form a series electrical circuit.

24. A foldable electric powered child riding vehicle comprising:

a front module;

a rear module pivotally coupled to the front module;

at least one mounting assembly connected between the front module and the rear module, the mounting assembly allowing the modules to be selectively moved between a deployed state in which the modules are secured to each other in a riding position and operating power may be provided to the vehicle, and an undeployed state in which operating power is prevented from being provided to the vehicle, and a test circuit indicating when the front module and the rear module are secured in the riding configuration.

25. The vehicle of claim 24, wherein the test circuit comprises a light emitting diode (LED) and a push-button switch enabling the LED to radiate visible light when the front module and the rear module are secured in the riding configuration.

* * * * *